US005506993A

United States Patent [19]
Fitch et al.

[11] Patent Number: 5,506,993
[45] Date of Patent: Apr. 9, 1996

[54] MESSAGE PACKET TRANSMITTER

[75] Inventors: Blake G. Fitch, New Rochelle; Mark E. Giampapa, Irvington, both of N.Y.; Douglas J. Joseph, New Fairfield, Conn.

[73] Assignee: International Business Machines Corporation, Armonk, N.Y.

[21] Appl. No.: 25,109

[22] Filed: Mar. 2, 1993

[51] Int. Cl.[6] .......................................... H04J 3/24
[52] U.S. Cl. .......................... 395/800; 370/60; 370/94.1; 395/735
[58] Field of Search ................................ 395/800; 370/60, 370/94.1; 364/DIG. 1

[56] References Cited

U.S. PATENT DOCUMENTS

| | | | |
|---|---|---|---|
| 3,979,719 | 9/1976 | Tooley et al. | 340/146.1 |
| 4,750,109 | 6/1988 | Kita | 364/DIG. 1 |
| 4,802,161 | 1/1989 | Byars et al. | 370/94 |
| 4,933,933 | 6/1990 | Dally et al. | 370/60 |
| 5,091,905 | 2/1992 | Amada | 370/60 |
| 5,103,444 | 4/1992 | Leung et al. | 370/60 |
| 5,126,999 | 6/1992 | Munter et al. | 370/60 |
| 5,128,926 | 7/1992 | Perlman et al. | 370/54 |
| 5,128,932 | 7/1992 | Li | 370/60 |
| 5,136,584 | 8/1992 | Hedlund | 370/94.1 |
| 5,138,615 | 8/1992 | Lamport et al. | 370/94.3 |
| 5,140,584 | 8/1992 | Suzuki | 370/60 |

*Primary Examiner*—Alyssa H. Bowler
*Assistant Examiner*—Walter D. Davis, Jr.
*Attorney, Agent, or Firm*—Whitham, Curtis, Whitham & McGinn; Robert Tassinari

[57] ABSTRACT

A message packet transmitter for transmitting a packet of electronic data signals onto a communication network without interruption. A first-in, first-out electronic memory has a transmit state in which an electronic data signal stored therein is output. The electronic memory has an idle state in which electronic data signals stored therein are not output. A message packet-in-transit identification circuit generates a packet-in-transit signal after the electronic memory outputs the first electronic data signal in a message packet. A no-packet-in-transit signal is generated after the electronic memory outputs the last electronic data signal in the message packet. A state controller maintains the electronic memory in the transmit state when the electronic memory stores at least a portion of a message packet, when the state controller receives a packet-in-transit signal, and when the state controller receives an interrupt-pending signal.

7 Claims, 6 Drawing Sheets

MESSAGE PACKET TRANSMITTER

BACKGROUND OF THE INVENTION

The invention relates to electronic message packet transmitters, such as for transmitting a packet of electronic data signals onto a communication network.

In a packet-switched communication network, a path from a message source to a message destination is generated in the network for each message packet being transmitted. Each segment of the communication path (connecting adjacent switches in the communication network) is opened by the transmission of the first data signal in the packet onto the segment. Each communication path segment is closed by the receipt of the last data signal in the packet by a device at the receiving end of the segment. When a segment of the communication path for a message packet is open, no other message can travel over that path segment.

When the message transmitter stalls after transmitting only a portion of the data signals in a message packet onto the communication network, the data signals on the network continue to travel through the network to the message destination, thereby opening additional communication path segments. However, since the last data signal in the packet has not yet been transmitted onto the communication network, none of the opened path segments are closed. Consequently, the number of path segments opened by the message packet can become large (for example, larger than the number of data signals in the message packet). Moreover, since the path segments opened by the message packet cannot be used by other messages, communication network utilization can be seriously degraded. In the worst case, a deadlock may arise between two or more partially transmitted messages, preventing their complete transmission.

SUMMARY OF THE INVENTION

It is an object of the invention to provide an electronic message transmitter which transmits complete message packets without stalling after a portion of the message packet is transmitted onto the communication network.

It is another object of the invention to provide an electronic message transmitter which will not start to transmit a message packet onto a communication network while an interrupt is pending.

A message packet transmitter according to the present invention, comprises a first-in, first-out electronic memory for storing a plurality of electronic data signals forming at least a portion of at least one message packet. Each message packet comprises a first electronic data signal and a last electronic data signal. The electronic memory has a message data input for receiving electronic data signals, and has a message data output for outputting electronic data signals. The electronic memory has a transmit state in which an electronic data signal stored therein is output at the message data output, and has an idle state in which electronic data signals stored therein are not output at the message data output.

A message packet-in-transit identification circuit generates a packet-in-transit signal after the electronic memory outputs the first electronic data signal in a message packet. The packet-in-transit identification circuit generates a no-packet-in-transit signal after the electronic memory outputs the last electronic data signal in the message packet.

A state controller has an interrupt input for receiving an interrupt signal, and has a transmit-status input for receiving a packet-in-transit signal. The state controller maintains the electronic memory in the transmit state when the electronic memory stores at least a portion of a message packet, the transmit-status input of the state controller receives a packet-in-transit signal, and the interrupt input of the state controller receives an interrupt-pending signal.

The first-in, first-out electronic memory may, for example, generate a packet-in-memory signal when the first-in, first-out electronic memory contains at least a portion of at least one message packet. The state controller may have a memory-content-status input for receiving a packet-in-memory signal.

In one aspect of the invention, the state controller switches the electronic memory from the idle state to the transmit state when the memory-content-status input of the state controller receives a packet-in-memory signal, the transmit-status input of the state controller receives a packet-in-transit signal, and the interrupt input of the state controller receives an interrupt-pending signal.

Preferably, the state controller maintains the electronic memory in the transmit state when the memory-content-status input of the state controller receives a packet-in-memory signal, the transmit-status input of the state controller receives a packet-in-transit signal, and the interrupt input of the state controller receives either a no-interrupt-pending signal, or an interrupt-pending signal.

In a further aspect of the invention, the state controller switches the electronic memory from the transmit state to the idle state when the transmit-status input of the state controller receives a no-packet-in-transit signal, and the interrupt input of the state controller receives a no-interrupt-pending signal.

The state controller preferably maintains the electronic memory in the idle state when the electronic memory is in the idle state, the transmit-status input of the state controller receives a no-packet-in-transit signal, and the interrupt input of the state controller receives an interrupt-pending signal.

The state controller preferably switches the electronic memory from the idle state to the transmit state when the memory-content-status input of the state controller receives a packet-in-memory signal, and the interrupt input of the state controller receives a no-interrupt-pending signal.

The message packet transmitter according to the present invention may further comprise a data source having a first state for providing a series of electronic data signals to the message data input of the electronic memory. The data source also has a second state for not providing electronic data signals to the message data input of the electronic memory. The state controller switches the data source from the first state to the second state when the interrupt input of the state controller receives an interrupt-pending signal and the transmit status input of the state controller receives a no-packet-in-transit signal.

The state controller preferably maintains the data source in the first state when the data source is in the first state and the transmit-status input of the state controller receives a packet-in-transit signal and the interrupt input of the state controller receives an interrupt signal.

According to one aspect of the invention, the first electronic data signal in each message packet comprises a length signal representing the number of electronic data signals in the message packet. The message packet-in-transit identification circuit comprises a packet-in-transit counter for generating a packet-in-transit signal representing the number of electronic data signals in the message packet which have not been output by the electronic memory.

By providing a message packet transmitter having a message packet-in-transit identification circuit for generating a packet-in-transit signal after the electronic memory outputs the first electronic data signal in a message packet, and by providing a state controller for maintaining the electronic memory in the transmit state when the electronic memory stores at least a portion of a message packet, and the transmit-status input of the state controller receives a packet-in-transit signal and the interrupt input of the state controller receives an interrupt-pending signal, it is assured that the message packet transmitter will transmit complete message packets without stalling after a portion of the message packet is transmitted onto the communication network.

By providing a message packet transmitter in which the state controller maintains the electronic memory in the idle state when the electronic memory is in the idle state, and the transmit-status input of the state controller receives a no-packet-in-transit signal, and the interrupt input of the state controller receives an interrupt pending signal, it is assured that the message packet transmitter will not start to transmit a message onto a communication network while an interrupt is pending.

DESCRIPTION OF THE PREFERRED EMBODIMENTS

Figure 1:
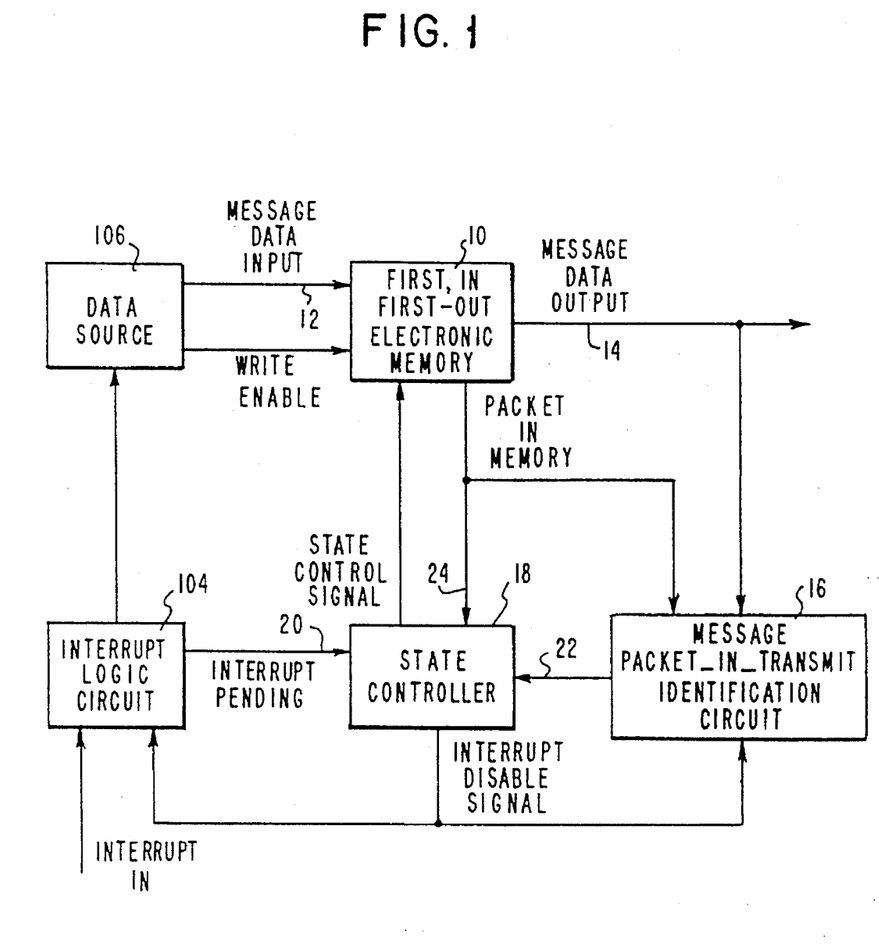
FIG. 1 is a block diagram of an example of a message packet transmitter according to the invention.

FIG. 1 is a block diagram of an example of a message packet transmitter according to the invention. The message packet transmitter comprises a first-in, first-out electronic memory 10 for storing a plurality of electronic data signals forming at least a portion of at least one message packet. Each message packet comprises a first electronic data signal and a last electronic data signal. The electronic memory 10 has a message data input 12 for receiving electronic data signals. Electronic memory 10 also has a message data output 14 for outputting electronic data signals.

The electronic memory 10 has a transmit state in which an electronic data signal stored therein is output at the message data output 14. Electronic memory 10 also has an idle state in which electronic data signals stored therein are not output at the message data output 14.

The message packet transmitter further comprises a message packet-in-transit identification circuit 16. The message packet-in-transit identification circuit 16 generates a packet-in-transit signal after the electronic memory 10 outputs the first electronic data signal in a message packet. The packet-in-transit identification circuit 16 also generates a no-packet-in-transit signal after the electronic memory 10 outputs the last electronic data signal in the message packet.

The message packet transmitter according to the invention further includes a state controller 18. The state controller 18 has an interrupt input 20 for receiving an interrupt-pending signal. State controller 18 also has a transmit-status input 22 for receiving a packet-in-transit signal. The state controller 18 maintains the electronic memory 10 in the transmit state when the electronic memory 10 stores at least a portion of a message packet, the transmit-status input 22 of the state controller 18 receives a packet-in-transit signal, and the interrupt input 20 of the state controller 18 receives an interrupt-pending signal.

The first-in, first-out electronic memory 10 may, for example, generate a packet-in-memory signal when the first-in, first-out electronic memory 10 contains at least a portion of at least one message packet. The state controller 18 has a memory-content-status input 24 for receiving a packet-in-memory signal.

Figure 2:
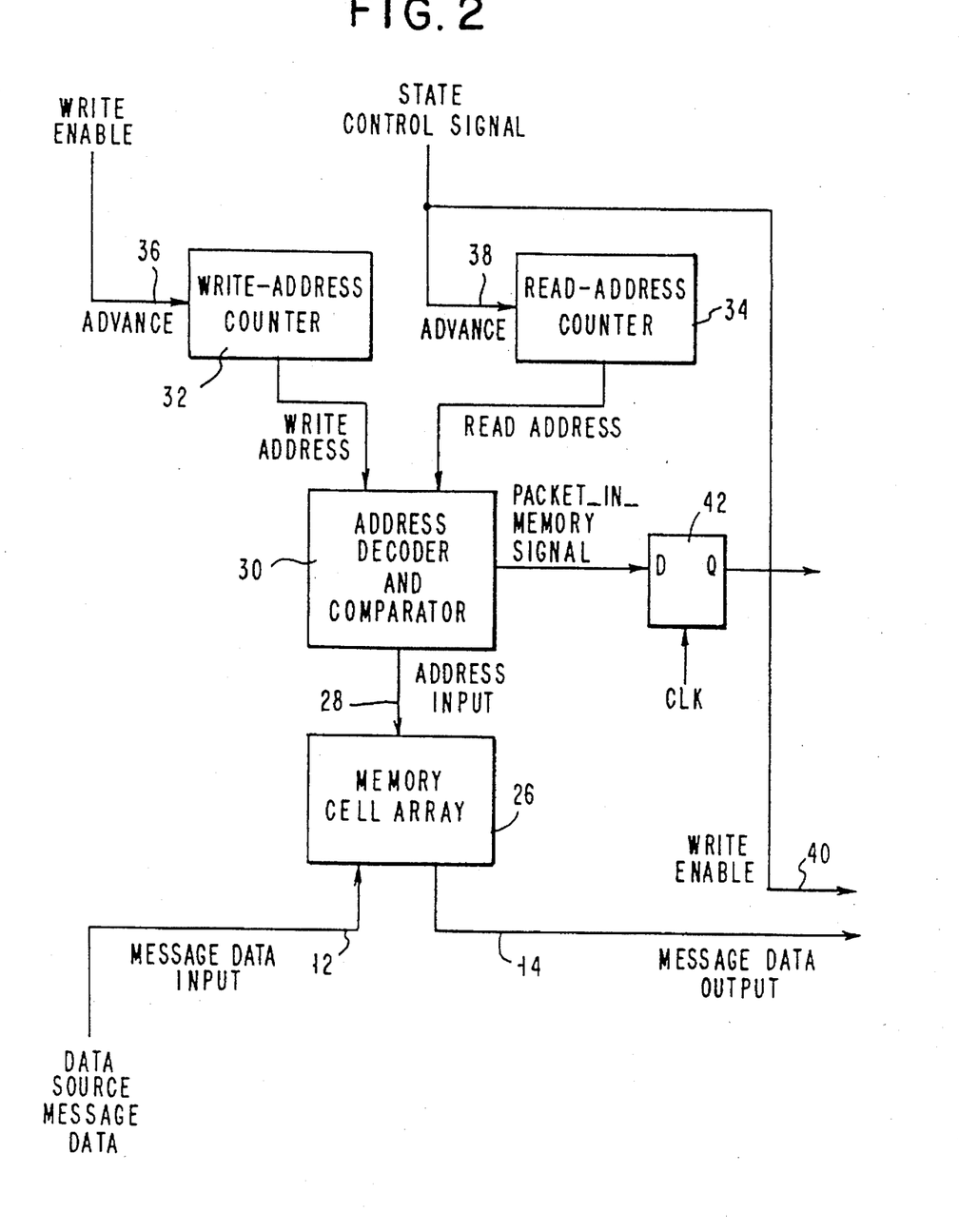
FIG. 2 is a block diagram of an example of a first-in, first-out electronic memory for use in the message packet transmitter of FIG. 1.

FIG. 2 is a block diagram of an example of a first-in, first-out electronic memory 10. The electronic memory 10 includes a memory cell array 26 connected to the message data input 12 and connected to the message data output 14. The memory cell array 26 has an address input 28 which receives an address from an address decoder and comparator 30.

The address decoder and comparator 30 receives a write address from a write-address counter 32, and receives a read address from a read-address counter 34. If the memory cell array 26 is a single-port array, the read and write addresses are multiplexed in time so as to provide one address at a time to the address decoder and comparator 30. If the memory cell array 26 is a dual port array, read and write addresses may be applied at the same time, and message data can be input at the same time that message data is output.

The write-address counter 32 and the read-address counter 34 each have advance inputs 36 and 38, respectively. When the memory cell array 26 is empty, both counters 32 and 34 point to the same address in the memory cell array 26. When a message data signal appears at the message data input 12 and a write enable signal appears at the advance input 36, the message data signal is stored in the memory cell array 26 at the location identified by the write-address counter 32, and the write-address counter 32 is then advanced to the address of the next memory location in memory cell array 26.

When a state control signal appears at the advance input 38 of the read-address counter 34, message data stored in the memory cell array 26 at the location identified by the contents of the read-address counter 34 is output on the message data output 14, a write enable signal is output on write enable line 40, and the read-address counter 34 is advanced to point to the next memory location in the memory cell array 26.

Address decoder and comparator 30 compares the write address from write-address counter 32 with the read address from the read-address counter 34 and generates a packet-in-memory signal when the first-in, first-out memory 10 contains at least a portion of at least one message packet. The packet-in-memory signal may be latched by a delay latch 42. To compensate for the delay, the address decoder and comparator may generate a no-packet-in-memory signal when the read address advances to within one memory location of the write address. The write-address counter 32 and the read-address counter 34 may advance either by counting up, or by counting down.

Figure 3:
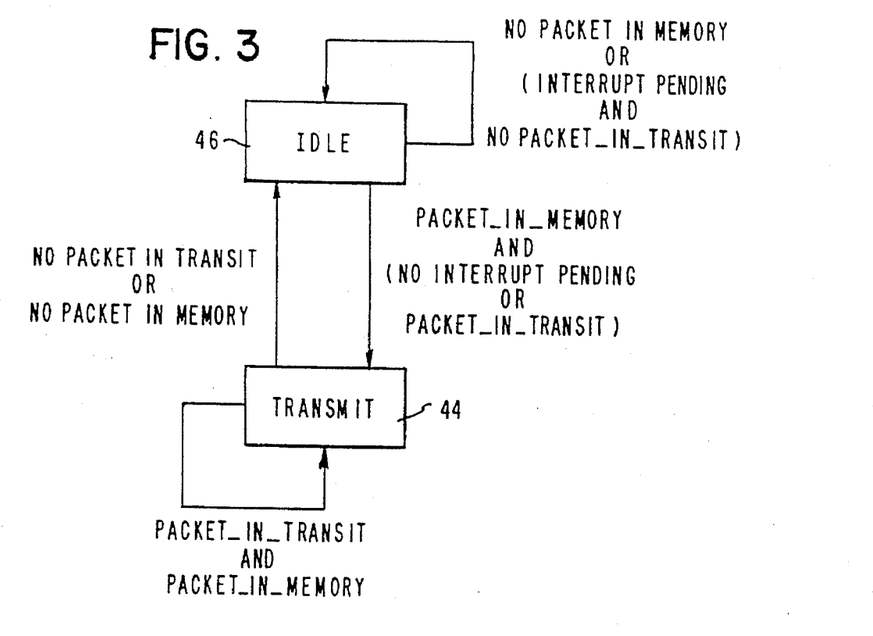
FIG. 3 is an example of a state diagram for the state controller of the message packet transmitter of FIG. 1.

FIG. 3 is an example of a state diagram for the state controller 18 of FIG. 1. In this example, the state controller 18 has a transmit state 44 corresponding to the transmit state of the first-in, first-out electronic memory 10, and has an idle state 46 corresponding to the idle state of the first-in, first-out electronic memory 10. As shown in FIG. 3, the state controller switches the electronic memory from the idle state 46 to the transmit state 44 when the memory-content status input 24 of the state controller 18 receives a packet-in-memory signal and the transmit-status input 22 of the state controller 18 receives a packet-in-transit signal, and the interrupt input 20 of the state controller 18 receives an interrupt-pending signal.

The state controller 18 maintains the electronic memory 10 in the transmit state when the memory-content-status input 24 of the state controller 18 receives a packet-in-memory signal and the transmit-status input 22 of the state controller 18 receives a packet-in-transit signal, and the interrupt input of the state controller 18 receives either an interrupt-pending signal or a no-interrupt-pending signal.

From FIG. 3, it is also seen that the state controller 18 switches the electronic memory 10 from the transmit state 44 to the idle state 46 when the transmit-status input 22 of the state controller 18 receives a no-packet-in-transit signal, and the interrupt input 20 of the state controller 18 receives either an interrupt-pending signal or a no-interrupt-pending signal.

The state controller 18 maintains the electronic memory 10 in the idle state 46 when the electronic memory 10 is in the idle state, the transmit-status input 22 of the state controller 18 receives a no-packet-in-transit signal, and the interrupt input 20 of the state controller 18 receives an interrupt-pending signal.

The state controller 18 also switches the electronic memory 10 from the idle state 46 to the transmit state 44 when the memory-content-status input 24 of the state controller 18 receives a packet-in-memory signal, and the interrupt input 20 of the state controller 18 receives a no-interrupt-pending signal.

Figure 4:
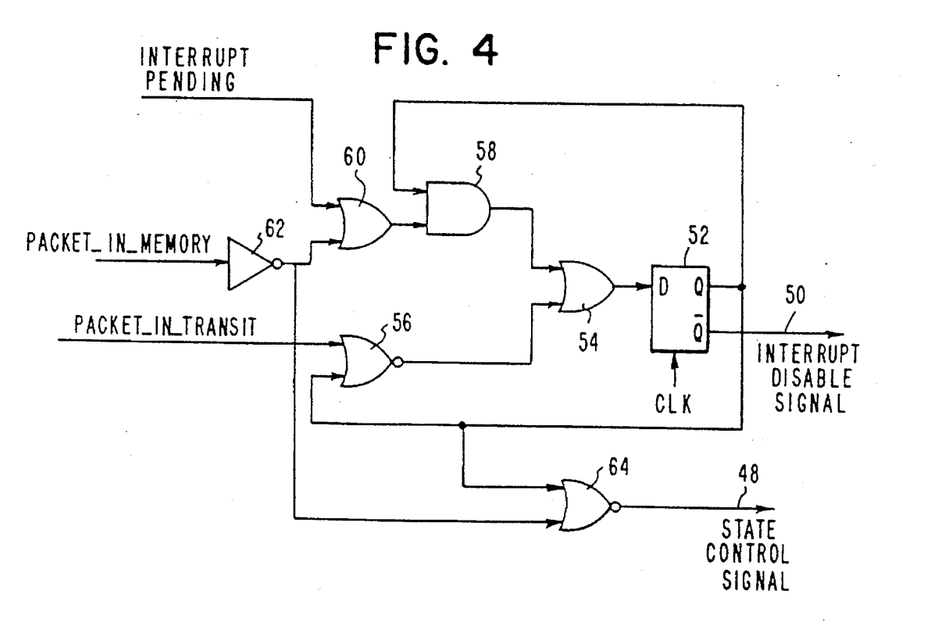
FIG. 4 is a block diagram of an example of the state controller of FIG. 1.

FIG. 4 is a block diagram of an example of a state controller 18 having the states and transitions shown in the state diagram of FIG. 3. As shown in FIG. 4, the state controller has a state control signal output 48, and has an interrupt disable signal output 50. By way of the delay latch 52, the OR gate 54, and the NOR gate 56, an interrupt disable signal $\overline{Q}=1$ is produced at the output 50 when a packet-in-transit signal PIT=1 is applied at one input of the NOR gate 56, and an inverted interrupt disable signal Q=0 is applied to the other input of NOR gate 56. Only when a no-packet-in-transit signal PIT=0 is applied to NOR gate 56 will the interrupt disable signal switch from $\overline{Q}=1$ to $\overline{Q}=0$ (interrupt enable).

When there is a no-interrupt-disable signal $\overline{Q}=0$ at output 50, the no-interrupt-disable signal will remain at $\overline{Q}=0$ unless an interrupt pending IP=1 appears at one input to OR gate 60, or a no-packet-in-memory signal PIM=0 appears at inverter 62. However, when an interrupt disable signal $\overline{Q}=1$ appears at output 50, the inverted interrupt disable signal Q=0 at an input to AND gate 58 maintains $\overline{Q}=1$ when an interrupt pending signal IP=1 appears at one input to OR gate 60 or a no-packet-in-memory signal PIM=0 appears at the inverter 62.

The state control signal at output 48 will have a value of "1", representing the transmit state only when an inverted interrupt disable signal Q=0 appears at one input to NOR gate 64, and when an inverted packet-in-memory signal $\overline{PIM}=0$ appears at the other input to NOR gate 64. When the state control signal at output 48 has a value of "1" representing the transmit state, the read-address counter 38 of the electronic memory 10 of FIG. 2 advances with each read cycle, and a write enable signal is provided at write enable line 40 of the electronic memory 10.

Figure 5:
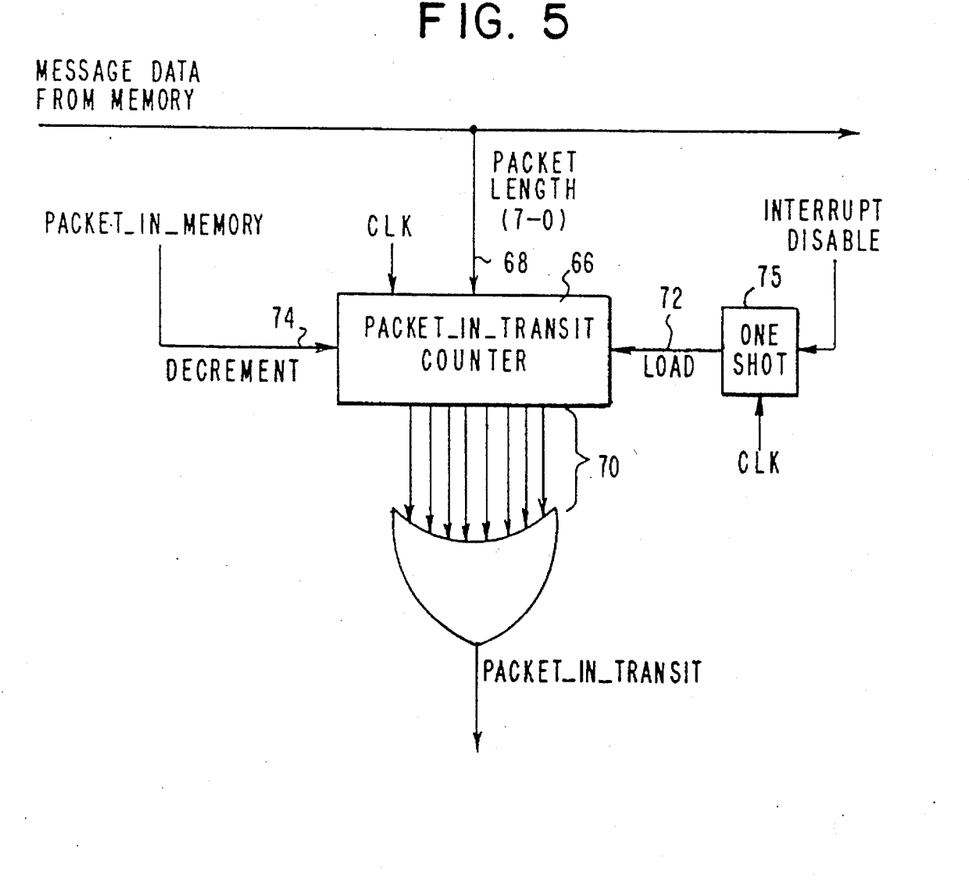
FIG. 5 is a block diagram of an example of a message packet-in-transit identification circuit for the message packet transmitter of FIG. 1.

FIG. 5 is a block diagram of an example of a message packet-in-transit identification circuit 16. The message packet-in-transit identification circuit 16 contains a packet-in-transit counter 66 having a data input 68, an 8-bit count output 70, a load enable input 72, and a decrement enable input 74. Each message data signal which is output from the electronic memory 10 also appears on the data input 68 of the packet-in-transit counter 66. A "one shot" circuit 75 provides a one cycle load signal to the load enable input 72 of the packet-in-transit counter 66 only when an interrupt disable signal changes from "0" to "1" at the input of the "one shot" circuit 75. The production of the load signal by the "one shot" 75 therefore coincides with the output of the first data signal of a new message packet from the memory 10. By providing the first electronic data signal in each message packet with a value equal to the length of the message packet, the packet-in-transit counter 66 is loaded with an initial count equal to the packet length.

Thereafter, during each cycle in which a packet-in-memory signal PIM=1 appears at the decrement enable input 74 of the packet-in-transit counter 66, the count is reduced by one. An OR gate 76 generates a packet-in-transit signal PIT=1 so long as the value in counter 66 is not zero.

Figure 6:
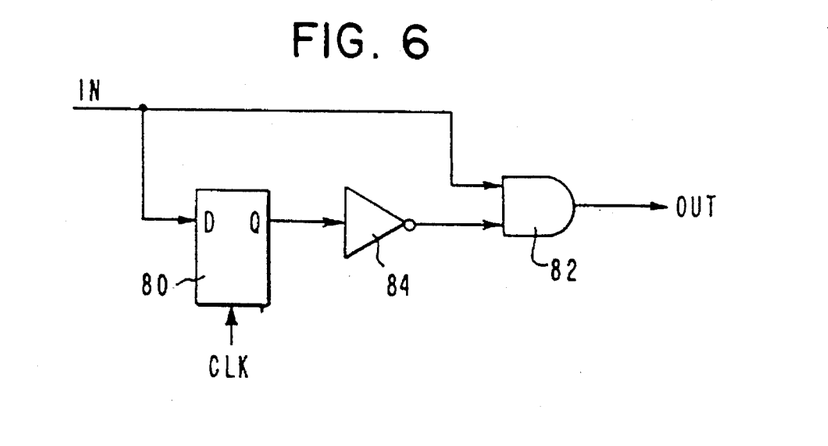
FIG. 6 is a block diagram of an example of a "one shot" circuit for the message packet-in-transit identification circuit of FIG. 5.

FIG. 6 is a block diagram of an example of the "one shot" circuit 76 of FIG. 5. As shown therein, delay latch 80, AND gate 82, and inverter 84 assure that the "one shot" circuit will output a "1" only when the input of the "one shot" circuit on the current cycle is "1", and the input of the "one shot" circuit on the immediately prior cycle is "zero".

Figure 7:
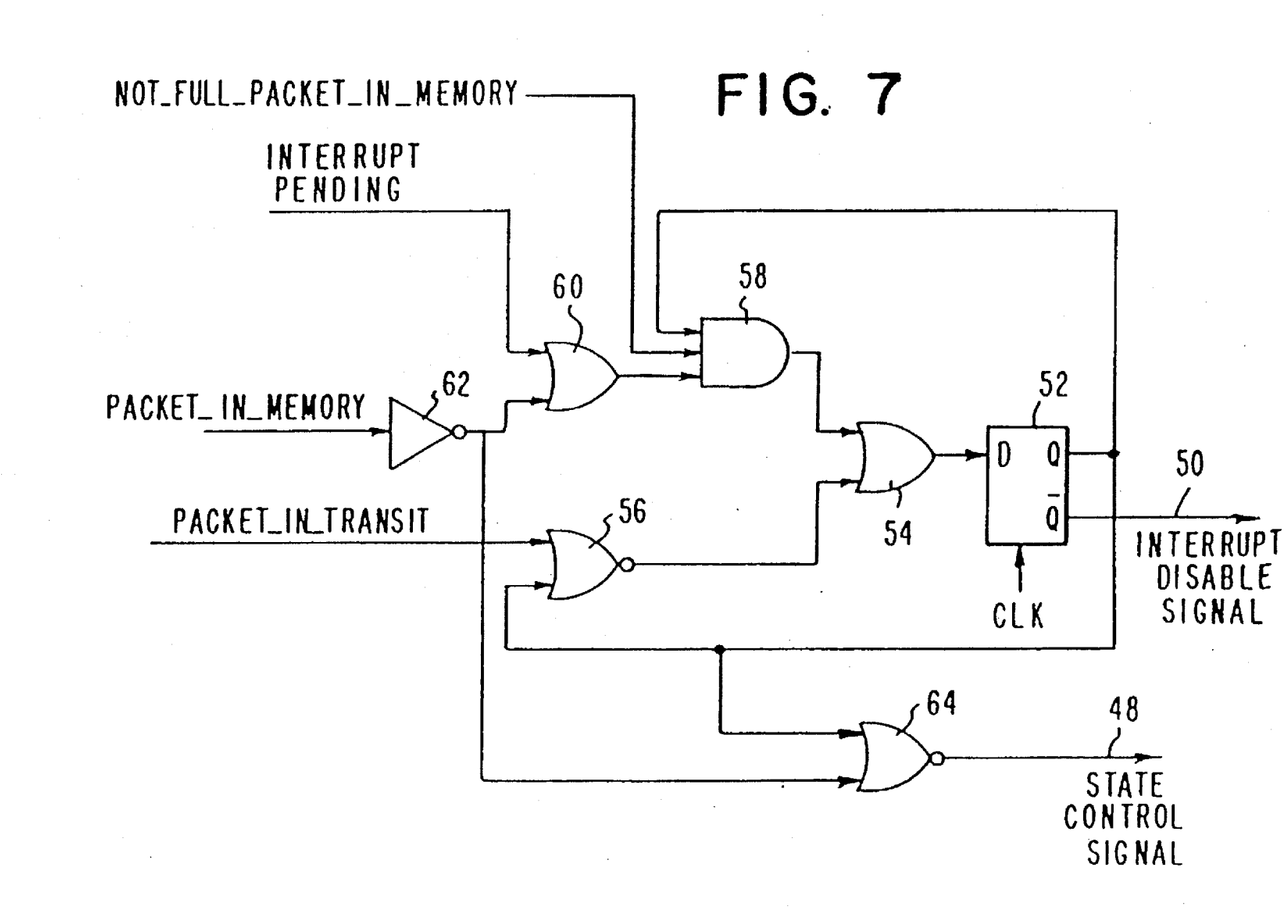
FIG. 7 is a block diagram of another example of a state controller for the message packet transmitter of FIG. 1.

FIG. 7 is a block diagram of another example of state controller 18 of FIG. 1. The state controller shown in FIG. 7 is identical to the state controller shown in FIG. 4 with the exception of AND gate 58. A not-full-packet-in-memory signal is applied to a third input of AND gate 58. When there is a full message packet in electronic memory 10 (in addition to any message packet partially transmitted from memory 10 and any message packet partially received by memory 10), an interrupt pending signal at an input to OR gate 60 will not prevent the interrupt disable signal from switching from $\overline{Q}=0$ to $\overline{Q}=1$, and therefore will not prevent the state controller from switching from the idle state 46 to the transmit state 44.

Figure 8:
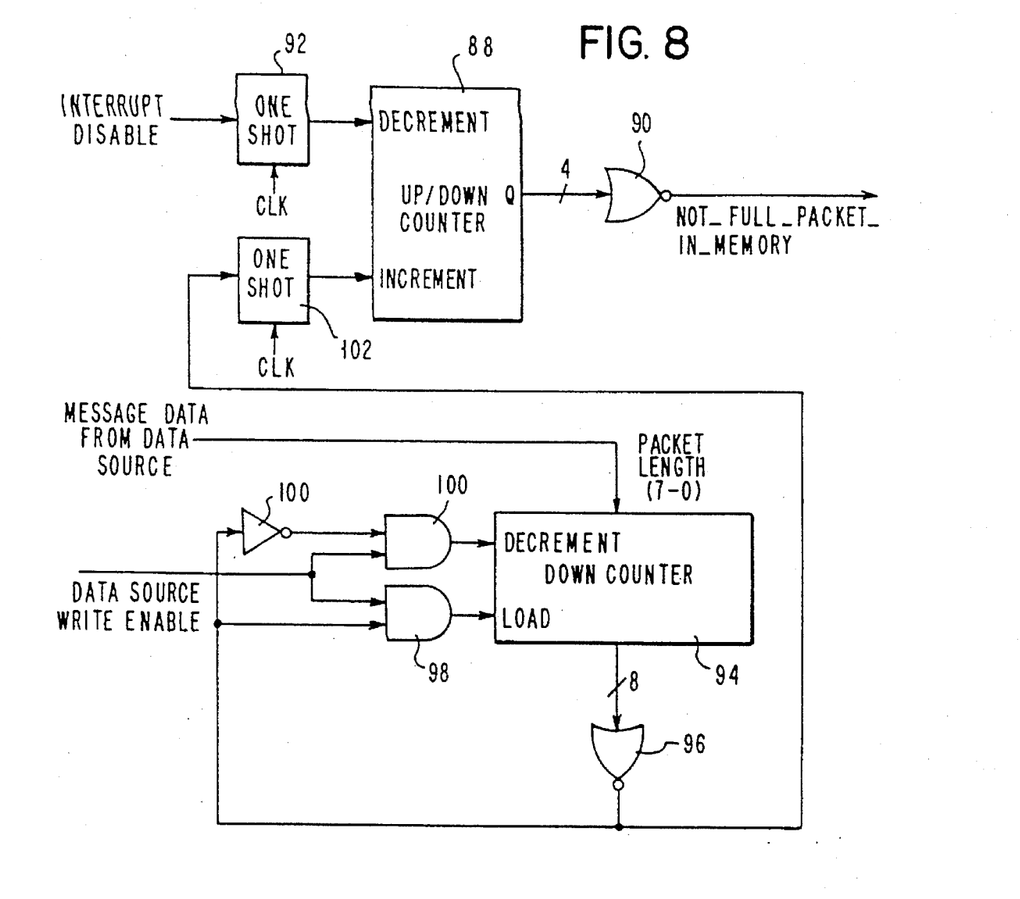
FIG. 8 is a block diagram of an example of a circuit for generating a not-full-packet-in-memory signal for the state controller of FIG. 7.

FIG. 8 is a block diagram of an example of a circuit for producing a not-full-packet-in-memory signal for the state controller of FIG. 7. An up/down counter 88 has a value equal to the number of full message packets stored in electronic memory 10. A NOR gate 90 outputs a "1" signal representing not-full-packet-in-memory when the value of the counter 88 is zero. The up/down counter 88 may be, for example, a four bit counter.

Each time the first data signal of a message packet is read out of electronic memory 10, the interrupt disable signal of state controller 18 (FIGS. 4 and 7) changes from "0" to "1". By providing the interrupt disable signal to the input of "one shot" circuit 92, a decrement signal is applied to the decrement input of up/down counter 88, thereby reducing the count by one.

When the first data signal of a new message packet is input into the electronic memory 10 from a data source and when the data source provides a write enable signal, the value of the first data signal "representing the packet length" is written into a down counter 94. Initially, down counter 94 has a value of zero. By way of NOR gate 96 and AND gate 98, when the data source provides the write enable signal, the down counter 94 is load enabled at the same time that the first data signal of the message packet appears at the data input of the down counter 94.

Thereafter, when the value of the count in down counter 94 is nonzero, NOR gate 96 and AND gate 100 cause the down counter 94 to decrement during each cycle which the data source provides a write enable signal. When an entire message packet is loaded into the electronic memory 10, the count in down counter 94 changes from "1" to "0", the output of NOR gate 96 changes from "0" to "1", and "one shot" circuit 102 causes the up/down counter 88 to increase by one.

Returning to FIG. 1, the message packet transmitter may further include an interrupt logic circuit 104 and a data source 106. The data source has a first state for providing a series of electronic data signals to the message data input of the electronic memory. The data source also has a second state for not providing electronic data signals to the message data input of the electronic memory. By way of the interrupt logic circuit 104, the state controller 18 switches the data source 106 from the first state to the second state when the interrupt input 20 of the state controller 18 receives an interrupt-pending signal and the transmit-status input 22 of the state controller 18 receives a no-packet-in-transit signal.

The state controller 18 maintains the data source 106 in the first state when the data source 106 is in the first state, and the transmit-status input 22 of the state controller receives a packet-in-transit signal, and the interrupt input 20 of the state controller 18 receives an interrupt signal.

The data source 106 may be, for example, a microprocessor writing data signals to a selected address.

Figure 9:
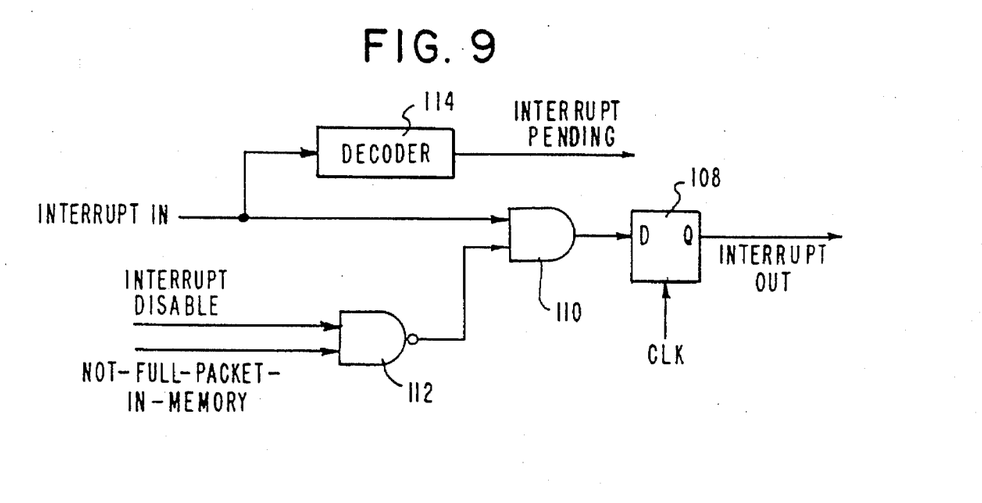
FIG. 9 is a block diagram of an example of an interrupt logic circuit for the message packet transmitter of FIG. 1.

FIG. 9 is a block diagram of an example of the interrupt logic circuit 104 of FIG. 1. By way of delay latch 108, AND gate 110, and NAND gate 112, an interrupt signal applied to the input of interrupt logic circuit 104 is applied to the data source 106 by way of the output of interrupt logic circuit 104 when either or both of the interrupt disable signal and the not-full-packet-in-memory signal have a value of "0". A decoder 114 generates an interrupt pending signal when an interrupt signal appears at the input of interrupt logic circuit 104.

By combining the interrupt logic circuit 104 of FIG. 9 with the enhanced state controller of FIG. 7, interrupts are passed to the data source 106 while a message packet is being transmitted from electronic memory 10 so long as there is at least one full message packet stored in memory 10 in addition to the message packet currently being transmitted from electronic memory 10.

We claim:

1. A message packet transmitter comprising:

a first-in, first-out electronic memory for storing a plurality of electronic data signals forming at least a portion of at least one message packet, each message packet comprising a first electronic data signal and a last electronic data signal, said electronic memory having a message data input for receiving electronic data signals from a data source, and having a message data output for outputting electronic data signals onto a communication network, said electronic memory generating a packet-in-memory signal when the first-in, first-out electronic memory contains at least a portion of at least one message packet, said electronic memory having a transmit state in which an electronic data signal stored therein is output at the message data output, said electronic memory having an idle state in which electronic data signals stored therein are not output at the message data output;

message packet-in-transit identification circuit connected to the message data output of said electronic memory and receiving the packet-in-memory signal for generating a packet-in-transit signal after the electronic memory outputs the first electronic data signal in a message packet, said packet-in-transit identification circuit generating a no-packet-in-transit signal after the electronic memory outputs the last electronic data signal in the message packet; and a state controller connected to the message packet-in-transit identification circuit and the first-in, first-out electronic memory and having an interrupt input for receiving an interrupt-pending signal generated in response to an interrupt signal to said data source and having a transmit-status input for receiving a packet-in-transit signal from the message packet-in-transit identification circuit and a memory-content-status input for receiving a packet-in-memory signal from the first-in, first-out electronic memory, said state controller outputting a state control signal to said electronic memory for maintaining the electronic memory in the transmit state when the electronic memory stores at least a portion of a message packet and the transmit-status input of the state controller receives a packet-in-transit signal even though the interrupt input of the state controller receives an interrupt-pending signal so that the message packet transmitter transmits complete message packets without stalling after a portion of the message packet is transmitted onto the communication network, and for maintaining the electronic memory in the idle state when the interrupt input of the state controller receives an interrupt-pending signal and the transmit-status input of the state controller receives a no packet-in-transit signal from the message packet-in-transit identification circuit so that the message transmitter will not start to transmit a message packet onto the communication network while an interrupt is pending; said state controller switching the electronic memory from the idle state to the transmit state when the memory-content-status input of the state controller receives a packet-in-memory signal, the transmit-status input of the state controller receives a packet-in-transit signal, and the interrupt input of the state controller receives an interrupt-pending signal, and said state controller maintaining the electronic memory in the transmit state when the memory-content-status input of the state controller receives a packet-in-memory signal, the transmit-status input of the state controller receives a packet-in-transit signal, and the interrupt input of the state controller receives a no-interrupt-pending signal.

2. A message packet transmitter as claimed in claim 1, characterized in that the state controller switches the electronic memory from the transmit state to the idle state when the transmit-status input of the state controller receives a no-packet-in-transit signal, and the interrupt input of the state controller receives an interrupt-pending signal.

3. A message packet transmitter as claimed in claim 2, characterized in that the state controller switches the electronic memory from the transmit state to the idle state when the transmit-status input of the state controller receives a no-packet-in-transit signal, and the interrupt input of the state controller receives a no-interrupt-pending signal.

4. A message packet transmitter as claimed in claim 3, characterized in that the state controller switches the electronic memory from the idle state to the transmit state when the memory-content-status input of the state controller receives a packet-in-memory signal, and the interrupt input of the state controller receives a no-interrupt-pending signal.

5. A message packet transmitter as claimed in claim 4, further comprising:

a data source having a first state for providing a series of electronic data signals to the message data input of the electronic memory, and having a second state for not providing electronic data signals to the message data input of the electronic memory; and characterized in that the state controller switches the data source from the first state to the second state when the interrupt input of the state controller receives an interrupt-pending signal and the transmit-status input of the state controller receives a no-packet-in-transit signal.

6. A message packet transmitter as claimed in claim 5, characterized in that the state controller maintains the data source in the first state when the data source is in the first state and the transmit-status input of the state controller receives a packet-in-transit signal and the interrupt input of the state controller receives an interrupt signal.

7. A message packet transmitter as claimed in claim 6, characterized in that:

the first electronic data signal in each message packet comprises a length signal representing a number of electronic data signals in the message packet; and the message packet-in-transit identification circuit comprises a packet-in-transit counter for generating a packet-in-transit signal representing the number of electronic data signals in the message packet which have not been output by the electronic memory.

\* \* \* \* \*